3,311,482
SINTERED TRANSPARENT BODIES OF ALUMINUM OXIDE AND METHOD OF PREPARING THE SAME

Emil A. Klingler, Alter Bergweg 4, Plochingen, Germany; Walther Dawihl, Rassweilerweg 3, Illingen, Germany; and Erhard Dörre, Weiherstrasse 3, Plochingen, Germany
No Drawing. Filed Jan. 25, 1966, Ser. No. 522,849
16 Claims. (Cl. 106—65)

This application is a continuation-in-part of our copending application Ser. No. 240,735, filed on Nov. 28, 1962, and now abandoned.

This invention relates to sintered transparent bodies of aluminum oxide and to a method for preparing the same. More particularly, the invention is concerned with sintered bodies of aluminum oxide which combine high mechanical strength with adequate transparency.

Two types of sintered aluminum oxide bodies have been known heretofore. Fine-grained opaque or barely translucent bodies of high mechanical strength at ordinary and elevated temperatures have been employed as cutting tools, as spinnerets, as turbine blades, and in similar applications. Coarse-grained bodies of sintered aluminum oxide transparent to visible light have been employed successfully as envelopes for electrical gas discharge tubes operating at high temperatures. The opacity of the fine-grained strong bodies and the relatively low mechanical strength of the coarse-grained transparent bodies have prevented the substitution of sintered aluminum oxide for fused quartz and certain special glasses where the combination of mechanical and optical properties of these materials was necessary, although the thermal stability of quartz and of heat resistant glasses is inferior to that of aluminum oxide.

The object of the invention is the provision of sintered aluminum oxide bodies which combine high mechanical strength with good transparency.

A more specific object is the provision of transparent aluminum oxide bodies which are fine-grained.

Another object is the provision of aluminum oxide bodies of high heat conductivity. In this respect, the invention aims at aluminum oxide bodies whose density approaches that of corundum crystals more closely than was heretofore possible.

Yet another object is the provision of a method of preparing such strong, transparent, dense aluminum oxide bodies.

With these and other objects in view, the invention in one of its aspects resides in a polycrystalline body consisting essentially of aluminum oxide with a minor admixture of a grain growth inhibitor such as magnesium oxide. The individual grains of the body have an average size of not more than ten microns, and preferably seven microns or less, and at least 80 percent of the grains are smaller than the latter average value. The specific gravity of the body is at least 3.96, and its in-line transmissivity is preferably at least 40 percent in layers of 0.5 millimeter with respect to all light having a wavelength between 0.4 and 2 microns.

In another aspect, the invention resides in a method of preparing the afore-described polycrystalline body. The method includes sintering a compact of a material consisting essentially of aluminum oxide with a minor admixture of grain growth inhibitor at about 1800 to 1950° C., at a pressure of not more than $10^{-3}$ torr for a period which may vary between not substantially more than three to thirty minutes, the operating temperatures and times being inversely related.

According to an additional feature of the invention, the aluminum oxide contained in the original compact is mechanically activated alumina having an X-ray diffraction spectrum in which the characteristic $K\alpha$ doublets are blurred by localized stress increases in the grain surface which may also cause high heat of adsorption for water vapor or increased heat of dissolution of the material.

We have found that good transparency and the fine crystalline structure known to be necessary for best mechanical strength are not necessarily mutually exclusive in a sintered aluminum oxide body, and that a very fine-grained sintered product can be transparent if mechanically activated alumina is heated to conventional sintering temperatures for relatively short periods, such as three minutes.

Magnesium oxide admixed to a conventional powdered aluminum oxide material inhibits growth of crystals in the sintered body to the extent that the transparent material obtained by prolonged heating is self-supporting and capable of withstanding moderate stresses. It is common practice, therefore, to treat aluminum oxide at high temperatures in the presence of small amounts of magnesium oxide, typically 0.25 percent, to retard grain growth and to avoid the inclusion of gas bubbles in the aluminum oxide grains.

Magnesium oxide, however, cannot prevent grain growth. A starting material consisting of a major amount of aluminum oxide comminuted to a sub-micron grain size, and of a minor amount of a similarly comminuted magnesium compound yielding magnesium oxide at the sintering temperature results in a sintered product having an average grain size well in excess of 10 microns, and typically of at least 20 microns when conventionally processed. The grain structure of the conventional product, moreover, is relatively irregular. A large average grain size and an irregular distribution of grain sizes are generally conducive to relatively low mechanical strength. At least a portion of the magnesium oxide originally present is lost during heat treatment in conventional sintering operations, and this fact further impairs the effectiveness of the inhibitor.

The specific gravity of the sintered aluminum oxide should be higher than 3.96. While a specific gravity of 3.96 appears to be quite close to that of corundum or of other macrocrystalline forms of $\alpha$-aluminum oxide, it indicates the presence of residual voids which interfere with heat transmission and permit the passage of gases under unfavorable conditions of temperature and pressure.

We have found that grain growth cannot be adequately suppressed by admixtures of magnesium oxide small enough not to interfere with transparency unless the sintering time is made substantially shorter than heretofore practical in the manufacture of transparent bodies, and that the shorter heating periods required to prevent grain growth are not effective in making the product transparent if the material does not have high surface energy.

When sintering takes place under proper conditions, we readily obtain sintered bodies whose specific gravities are 3.99 or even fractionally higher. Best results are obtained with the use of a highly activated alumina obtained by mechanical comminution of fused alpha aluminum oxide. The activation treatment must be carried out under such conditions as to cause substantially complete blurring of the $K\alpha$ doublets in the X-ray diffraction spectrum.

Impurities in the aluminum oxide affect the transparency of the sintered product in a manner basically well understood. When the aluminum oxide powder employed as a starting material has a purity of at least 99.99 percent, transparency is closely related to specific gravity. An increase in specific gravity from 3.96 to 3.97 under otherwise similar conditions is accompanied by an increase in transmissivity at 2 microns in .5 millimeter layers from 30 to 50 percent, and further improvements in transmissivity are observed when the density is raised further by reducing the pressure in the sintering furnace below $10^{-3}$ torr, or by otherwise excluding air and other gases having a molecular weight substantially greater than that of hydrogen at the sintering temperature.

The heat conductivity of the sintered aluminum oxide bodies of the invention is closely related to their specific gravity. Heat conductivity increases with specific gravity, and so does resistance to cracking under thermal stresses. Cutting tool bits sintered according to the method of the invention showed surprisingly long useful life before re-grinding became necessary. The better heat conductivity of the denser transparent bits of the invention as compared to opaque aluminum oxide bits sintered according to conventional methods is believed to be at least in part responsible for such improved service life. Turbine blades sintered according to the method of the invention may be operated at higher temperatures than ordinary opaque aluminum oxide blades, and this superiority is believed due to a large extent to the high specific gravity of our sintered bodies.

An in-line transmissivity of at least 60% at thicknesses of 0.5 millimeter is characteristic for the sintered aluminum oxide bodies of the invention over a wavelength range between 0.4 to 2 microns which encompasses the entire visible spectrum and a portion of the infrared spectrum. Infarared radiation having a wavelength greater than 2 microns is also transmitted, although transmissivity decreases with wavelength.

Whereas ordinary glass lamps cannot be employed at temperatures in excess of about 400 to 500° C. and the operating temperature of quartz lamps cannot exceed 600 to 900° C. for extended periods because of crystallization, lamp envelopes can be constructed from the transparent aluminum oxide bodies of the invention for continuous service at 1200° C. and even higher, thus permitting a higher yield of useful radiation for a given energy input and a more favorable distribution of the radiated energy over the spectral range.

The transparent fine-grained aluminum oxide bodies of the invention are superior to conventional transparent sintered aluminum oxide with respect to mechanical strength. It is practical to make lamp envelopes of smaller thickness from a material of our invention at equal internal pressure, or to increase the internal pressure at equal wall thickness. The gas permeability of lamp envelopes made from the high-density material of the invention is virtually nil, and far smaller than that of the sintered transparent aluminum oxide material heretofore produced. This property contributes significantly to longer life of electric lamps made with envelopes of our novel sintered aluminum oxide material.

The breakdown voltage of insulators made from the product of the invention is high, and the material has a low dielectric loss factor. Some of the physical properties of our sintered aluminum oxide bodies may be varied by known means. The aluminum oxide may be colored, for example, by the judicious addition of small amounts of coloring metal oxides such as oxides of cobalt or chromium to restrict their transparency to desired portions of the spectrum. The term transparency is employed herein in the conventional manner, a body having an in-line transmissivity of at least 40 percent being considered to be transparent.

The invention will further be illustrated by a specific example of the method of preparing a sintered aluminum oxide body of the invention, it being understood that the invention is not limited to the example.

*Example*

High-purity fused aluminum oxide was crushed and a fraction having an average particle size of three microns was selected by conventional screening. When it was subjected to X-ray diffraction analysis, with copper radiation it showed characteristic, sharply defined $K\alpha$ doublets.

The powder was subjected to grinding in a vibratory mill, which was charged with 3 kg. of the aluminum oxide powder, 2 liters water, and 15 kg. of aluminum oxide grinding balls. The $K\alpha$ doublets in the X-ray diffraction spectrum of a sample drawn after 150 hours were blurred practically to extinction, and the heat of adsorption of the sample with respect to water vapor at 30° C., and 1.6 torr was about 5.0 calories per gram. Its heat of solution was much higher than that of the starting material although the average particle size had been reduced only to 1.5 microns, the maximum particle size being 3 microns. The activated powder contained 99.9% $Al_2O_3$.

100 grams of the ground activated alumina were mixed with 0.50 gram finely comminuted magnesium carbonate and 10 milliliters ethylene glycol as a lubricant. The mixture was compacted in a mold at a pressure of 15,000 pounds per square inch.

The green compact was removed from the mold and slowly preheated in air to 1500° C. It was then transferred to a vacuum furnace. It was rapidly heated to 1900° C. while a vacuum of $10^{-4}$ torr was maintained in the furnace. The furnace was kept at 1900° C. for fifteen minutes after the mold reached this temperature and the vacuum was carefully maintained.

The sintered material was removed from the furnace. It had a specific gravity of 3.99, a flexural strength of 52 kilograms per square millimeter, and a specimen ground and polished to 0.5 millimeter thickness had a transmissivity of 60 percent of yellow sodium light. It had an average grain size of 7 microns, and at least eighty percent of the grains were smaller than the average size. The composition of the sintered body did not significantly differ from that of the starting material. The magnesium oxide content of 0.25 percent found in the transparent sintered body ultimately obtained fully corresponded to the originally admixed 0.50 percent magnesium carbonate.

It will be appreciated that the magnesium carbonate employed in the example may be replaced by equivalent amounts of other magnesium compounds which yield magnesium oxide during the sintering. Such compounds include magnesium fluoride and magnesium salts of other volatile acids, and magnesium oxide itself. They may be admixed to the aluminum oxide prior to grinding in the vibratory mill.

The sintering temperature employed in our method is determined by the inherent properties of aluminum oxide and by the short sintering times which are essential to the success of the method. For any predetermined sintering time, the sintering temperature of aluminum oxide is inherently limited to a range not substantially greater than 50° C. Fusion takes place and the desired grain structure is lost at a higher temperature, and adequate bonding of individual grains by sintering is impossible at lower temperature. The commonly employed sintering temperatures for aluminum oxide particles therefore are within the range from 1700° C. to 1950° C. Employing exceedingly short sintering times, this invention achieves sintered bonds of good mechanical strength near the higher limit of the conventional sintering range, preferably at temperatures between approximately 1850° C. and 1950° C.

The initial particle size of the aluminum oxide employed is within the particle size range used in conventional methods, and may be larger than one micron. Obviously, the grain size of the starting material cannot be larger than that of our finished product in which an average grain size of 10 microns must not be exceeded, and in which an average grain size of about seven microns gives the most favorable combination of mechanical strength and transparency. Grain growth in the short sintering process of the invention, however, is reduced to a fraction of that inherently occurring in conventional methods, and the use of a correspondingly coarser aluminum oxide powder is thus entirely practical. For best results, however, the maximum grain size should not exceed three microns, nor should the average grain size be greater than 1.5 microns.

Since no magnesium oxide is lost during heat treatment according to our method, the grain size control achieved by this inhibitor in amounts of 0.1 to 0.4 percent remains fully effective throughout the sintered bodies. The high uniformity of the small grains or crystals characteristic for the polycrystalline aluminum oxide bodies of our invention is believed to be at least partly due to the lack of outward diffusion of magnesium oxide during heat treatment.

A compacting pressure of 15,000 pounds per square inch, as exemplified above, is typical of the range of compacting pressures required to densely compact a finely comminuted aluminum oxide powder preparatory to sintering.

While the invention has been described with particular reference to specific embodiments, it is to be understood that it is not limited thereto, but is to be construed broadly and restricted solely by the scope of the appended claims.

What is claimed is:

1. A polycrystalline body consisting essentially of sintered grains of aluminum oxide, the average size of said grains being less than ten microns, said body having a specific gravity greater than 3.96, and an in-line transmissivity of at least 40 percent in layers of 0.5 millimeter for all light having a wavelength between 0.4 micron and 2 microns.

2. A body as set forth in claim 1, wherein the size of at least 80 percent of said grains is smaller than 7 microns.

3. A body as set forth in claim 2, wherein said average grain size is approximately 7 microns.

4. A body as set forth in claim 1, wherein said specific gravity is approximately 3.99.

5. A body as set forth in claim 1, containing an admixture of 0.1 to 0.4 percent magnesium oxide as a grain growth inhibitor.

6. A polycrystalline body consisting essentially of sintered grains of aluminum oxide having approximately 0.25 percent magnesium oxide admixed thereto, the average size of said grains being less than ten microns, and at least 80 percent of said grains having a grain size smaller than 7 microns, said body having a specific gravity greater than 3.96, and an in-line transmissivity of at least 40 percent in layers of 0.5 millimeter for all light having a wavelength between 0.4 micron and 2 microns.

7. A method of preparing a polycrystalline transparent body of fine-grained aluminum oxide which comprises:
   (a) compacting a powder essentially consisting of aluminum oxide particles having a particle size not substantially greater than three microns to form a compacted body,
      (1) said particles having an X-ray diffraction spectrum substantially free from Kα doublets; and
   (b) sintering said compacted body in the substantial absence of gases having a molecular weight substantially greater than that of hydrogen for a period between approximately three and thirty minutes at a temperature of 1700° C. to 1950° C.

8. A method as set forth in claim 7, wherein said particles have an average size greater than one micron, but not substantially greater than 1.5 microns.

9. A method as set forth in claim 7, wherein said compacted body is sintered in the absence of air.

10. A method as set forth in claim 9, wherein said compacted body is sintered at a pressure not higher than $10^{-3}$ torr.

11. A method as set forth in claim 7, wherein said powder is prepared from alpha aluminum oxide by comminution prior to said compacting until the average particle size thereof is reduced to not substantially more than 1.5 microns and until the Kα doublets in the X-ray diffraction spectrum of said alpha aluminum oxide are substantially completely blurred.

12. A method as set forth in claim 11, wherein a magnesium compound adapted to yield magnesium oxide in an amount of 0.1 to 0.4 percent of said aluminum oxide is admixed to said particles prior to said compacting.

13. A method as set forth in claim 12, wherein said compacted body is sintered for a period sufficient to transform said compacted body into a polycrystalline sintered body having an average grain size of less than ten microns, a specific gravity greater than 3.96, and an in-line transmissivity of at least 40 percent in layers of 0.5 millimeter for all light having a wavelength between 0.4 micron and 2 microns.

14. A method as set forth in claim 13, wherein said period is not substantially greater than fifteen minutes.

15. A method as set forth in claim 13, wherein said period is not substantially greater than three minutes.

16. A method as set forth in claim 7, wherein said temperature is 1850° C.

References Cited by the Examiner

UNITED STATES PATENTS

| | | | |
|---|---|---|---|
| 3,026,177 | 3/1962 | St. Pierre et al. | 106—65 |
| 3,026,210 | 3/1962 | Coble | 106—65 |

TOBIAS E. LEVOW, *Primary Examiner.*

J. E. POER, *Assistant Examiner.*